No. 672,126. Patented Apr. 16, 1901.
J. HICKEY.
HOG CHOPPING MACHINE.
(Application filed May 23, 1900.)
(No Model.) 2 Sheets—Sheet 1.
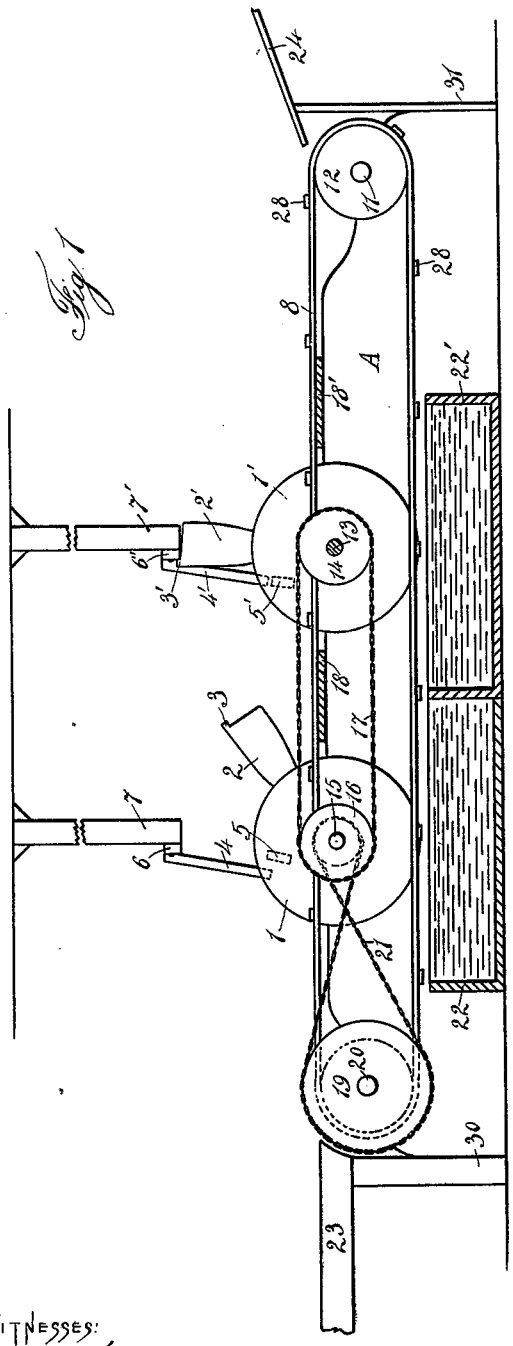
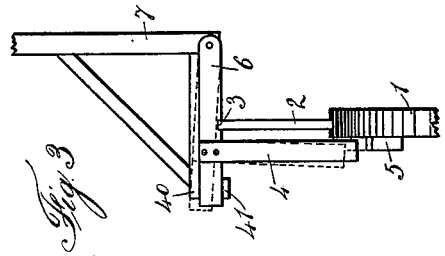
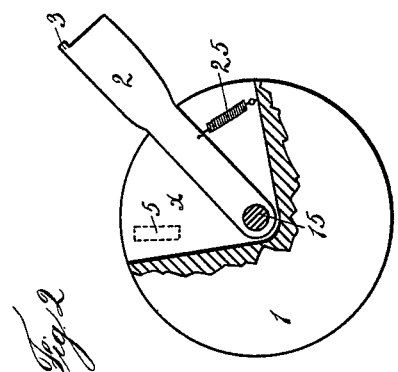
WITNESSES:
C. F. Patterson
Ray Davenport
INVENTOR
Joseph Hickey
PER Geo. W. Sues
ATTORNEY

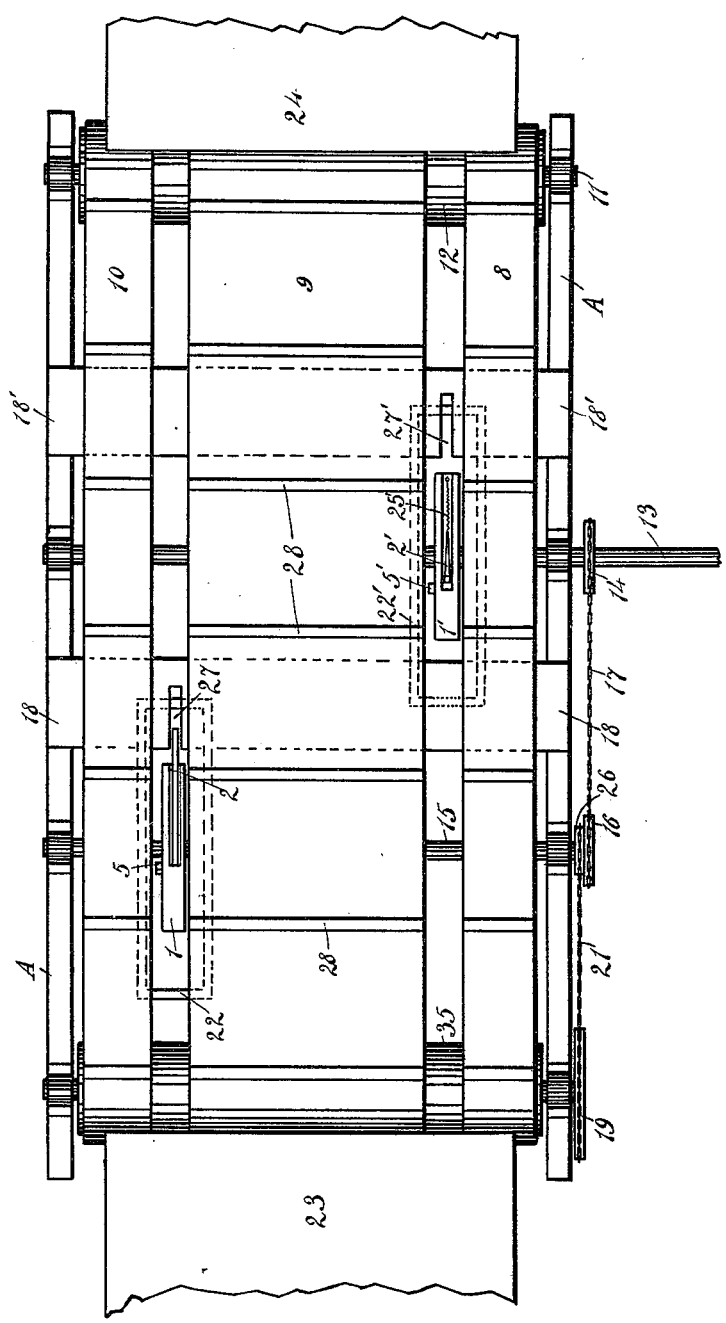

UNITED STATES PATENT OFFICE.

JOSEPH HICKEY, OF SOUTH OMAHA, NEBRASKA.

HOG-CHOPPING MACHINE.

SPECIFICATION forming part of Letters Patent No. 672,126, dated April 16, 1901.

Application filed May 23, 1900. Serial No. 17,777. (No model.)

*To all whom it may concern:*

Be it known that I, JOSEPH HICKEY, residing at South Omaha, in the county of Douglas and State of Nebraska, have invented certain useful Improvements in Hog-Chopping Machines; and I do hereby declare that the following is a full, clear, and exact description of the invention, such as will enable others skilled in the art to which it appertains to make and use the same, reference being had to the accompanying drawings, which form a part of this specification.

This invention relates to an improvement in hog-chopping machines.

The object of this invention is to provide a machine through which the half of a hog, with its head removed, passes to have the hams cut off, as well as to remove the shoulder-section.

In the accompanying drawings, Figure 1 shows a side elevation of a hog-chopping machine embodying my invention. Fig. 2 shows an enlarged detached detail disclosing the arrangement of one of the chopping-knives.
Fig. 3 shows a detail disclosing the trick mechanism for the knife, while Fig. 4 shows a top view of my device.

In the cutting up of a hog it is usually divided into two halves after the head has been removed. These half-hog sections are next chilled and then trimmed, as in treating the chilled meat there is less loss than in treating the meat immediately after the animal has been slaughtered.

As has been set forth, the aim of my invention is to provide a machine by means of which the hog may be expeditiously handled in removing the shoulder from a half-body section as well as removing the ham. In accomplishing this I construct an ordinary frame comprising the standards 30 and 31, from which project suitable sills A, which form the side portions of my supporting-standard. Extending transversely across the frame portions A are the shafts 20, 15, 13, and 11, the first supporting the drum 35, the second the chain-gears 26 and 16, the third the chain-gear 14, and the fourth the drum 12. The shaft 20 in addition is provided with the chain-gear 19, over which the chain 21 passes, so that the shaft 20 is in chain connection with the shaft 16, as is shown in Figs. 1 and 4.

The driving-shaft 13, by means of the chain 17, is connected to the shaft 15, while the two end shafts 11 and 20 are united by means of a sectional endless apron comprising the central portion 9 and the two side sections 8 and 10, as is shown in Fig. 4, each of these aprons being provided with the cleats 28. Supported below the aprons at a point adjacent to the shaft 15 is a table 18, while positioned adjacent the driving-shaft 13 is a table 18', the first being provided with the slot 27 and the second with the slot 27', as shown in Fig. 4.

Secured to the shaft 15 at a suitable point and between the aprons 9 and 10 is a chopping-knife 2, which is secured to the shaft 15 (referring now to Fig. 2) and works within a boxing 1, provided with the segmental recess $x$, the knife 2 being drawn toward one edge of the recess by means of a spring 25, as is shown in Fig. 2, so that to push this knife 2 toward the opposite end of the recess $x$ the work must be done against the pressure of the spring 25. This knife is provided with a projecting nose 3, as is shown. Referring to Fig. 4, the boxing 1 is shown secured to the shaft 15, the knife being adapted to pass through the slot 27 and in its downward swing is made to pass through hot water in a tank 22. This boxing 1 upon the side is provided with a lug 5. The shaft 13 is also provided with a boxing 1', the shaft 13 being provided with a knife 2', held by means of a spring 25', while upon the side is a lug 5', as is shown in Fig. 4 below, this knife being made to pass through a hot-water bath 22'.

Extending transversely across the machine is a support 40, preferably secured to a bar 7, depending from the ceiling of the apartment in which the machine is used, though uprights secured to the sides A may be employed. Pivotally secured to the transverse bar 40 is a trigger 6, which rests upon a stop 41, and depending from this trigger 6 is a bar 4, as is shown. This trigger 6 is positioned a suitable distance above the shaft 15, as is shown in Fig. 1, with a similar construction embodying the depending bar 7', the trigger 6', and bar 4', as is shown in Fig. 1. Connecting with the aprons 8, 9, and 10 is a table 24.

The motive power to drive the shaft 13 being applied and the machine being properly constructed, the operation would be as follows: As the shafts 13 and 15 were revolved they would carry with them the connected knives 2 and 2', these knives in their path passing through the hot water in tanks 22 and 22'. As they revolved, however, they would finally strike against the trigger 6 and be stopped or arrested in their progress by this trigger, while the boxings 1, being fixed to the shafts, the knives being only pivotally secured thereto, would revolve, so that the boxings would be operated against the tension of the springs 25 and 25'. However, just before the end of the segmental seating would strike the knife the lugs 5 would approach below the bars 4 and lift them to carry upward the trigger 6 to release the arrested knives, which by means of the springs 25 would now wind violently downward with a powerful stroke. The endless aprons 10 would be made to travel toward these knives, and the hog-sections to be cut would slide down the inclined table 24 upon the apron, where an operator would so guide the hog that the first knife 2' would promptly remove the ham, which after being severed would be carried forward upon the apron 8, while an operator upon the opposite side would then grab the hog-section and position it upon the aprons 9 and 10, so that the knife 2 would properly sever the shoulder-section, which shoulder-section would then pass onward on the apron 10, the main portion of the hog never leaving the major portion 9 of the apron, the hog-sections finally arriving at the table 23, where they would be taken care of by an additional operator.

The distance between the knives 2 and 2' is great enough to accommodate the largest hog likely to pass through the machine.

It is of course understood that any suitable shape could be given to the knives 2 and 2', so that they would make a straight cut or a curved cut in outline of the ham or shoulder sections, the meat passing over the table, and being cooled, and the knife passing through the hot water and being moistened and slightly warmed, so that it makes a clean cut without ragged edges and loss of material in passing through the product.

I do not wish to limit myself to the exact construction as herein shown, as modifications may be employed without departing from the spirit of my invention.

Having thus described my said invention, what I claim as new, and desire to secure by United States Letters Patent, is—

1. In a machine of the character described, a central and two adjacent aprons revolving in like directions, power-connected shafts below said aprons, a knife loosely working upon each shaft, there being one knife positioned between the central and each adjacent apron, one knife and attached shaft being set in advance of the other, each knife being secured to its supporting-shaft by means of a spring, a trigger-stop in the path of each knife to momentarily arrest the same to hold the knife under spring tension, and triggers to release said stops.

2. In a machine of the character described, a central and two adjacent aprons revolving in like directions, power-connected shafts below said aprons, a knife loosely working upon each shaft, there being one knife positioned between the central and each adjacent apron, one knife and attached shaft being set in advance of the other, each knife being secured to its supporting-shaft by means of a spring, a trigger-stop in the path of each knife to momentarily arrest the same to hold the knife under spring tension, triggers to release said stops, and a hot-water tank below and through which each knife is made to pass.

Signed in presence of two witnesses.

JOSEPH HICKEY.

Witnesses:
CLEMENT F. PATTERSON,
ETHEL SMITH.